United States Patent
Hislop et al.

(10) Patent No.: US 11,847,512 B1
(45) Date of Patent: Dec. 19, 2023

(54) METHOD AND APPARATUS FOR OPTIMIZING SYSTEM CALL (SYSCALL) PROCESSING

(71) Applicant: Dell Products, L.P., Hopkinton, MA (US)

(72) Inventors: Nigel Hislop, Springfield, VA (US); Xuedong Jiang, Andover, MA (US); Paul Bradley, Macroom (IE)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 17/857,228

(22) Filed: Jul. 5, 2022

(51) Int. Cl.
  *G06F 9/54* (2006.01)
  *G06F 9/48* (2006.01)

(52) U.S. Cl.
  CPC ............ *G06F 9/546* (2013.01); *G06F 9/4881* (2013.01); *G06F 2209/548* (2013.01)

(58) Field of Classification Search
  None
  See application file for complete search history.

(56) References Cited

U.S. PATENT DOCUMENTS

| | | | | |
|---|---|---|---|---|
| 5,307,491 A | * | 4/1994 | Feriozi | G06F 13/102 719/326 |
| 5,659,690 A | * | 8/1997 | Stuber | G06F 13/385 710/311 |
| 6,915,354 B1 | * | 7/2005 | Ozdemir | G06F 13/102 70/20 |
| 2004/0055003 A1 | * | 3/2004 | Sundaram | G06F 9/463 718/108 |
| 2007/0094402 A1 | * | 4/2007 | Stevenson | H04L 69/08 709/229 |
| 2012/0179837 A1 | * | 7/2012 | Bender | H04L 69/22 709/238 |

* cited by examiner

Primary Examiner — Charles E Anya
(74) Attorney, Agent, or Firm — Anderson Gorecki LLP

(57) ABSTRACT

A management daemon sorts syscalls received from the management applications into First In First Out (FIFO) queues and, when there is an available array control device, selects a syscall from one of the FIFO queues, and spawns a thread on the available array control device to service the selected syscall. The management system has a syscall scheduler configured to optimize handling of syscalls, by breaking long running syscalls into discrete operations, implementing a portion of the syscall, and then stopping operation of the syscall while saving the state of the partially executed syscall. The partially executed syscall is placed back into a queue for subsequent operation, thus freeing up the array control devise for use in connection with other syscalls. By optimizing syscall scheduling, and incremental processing of long running syscalls, it is possible to reduce the overall syscall processing time for a set of syscalls.

16 Claims, 11 Drawing Sheets

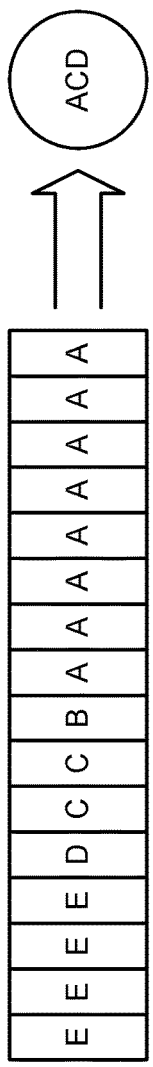
FIG. 7A
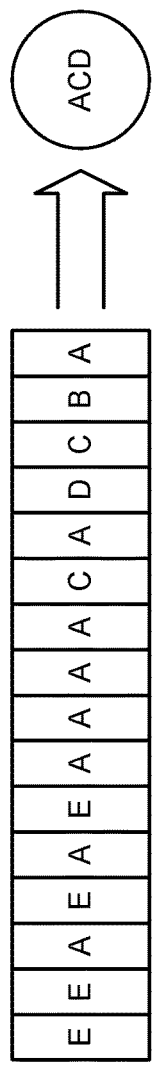
FIG. 7B
| Syscall | Arrival Time | Finish Time (existing scheme) | Response Time (existing scheme) | Finish Time (Optimized scheme) | Response Time (Optimized scheme) |
|---|---|---|---|---|---|
| A | 0 | 8 | 8 | 14 | 14 |
| B | 1 | 9 | 8 | 2 | 1 |
| C | 1 | 11 | 10 | 6 | 5 |
| D | 1 | 12 | 11 | 4 | 3 |
| E | 9 | 16 | 7 | 16 | 7 |
| Total | N/A | N/A | 44 | N/A | 30 |
FIG. 7C

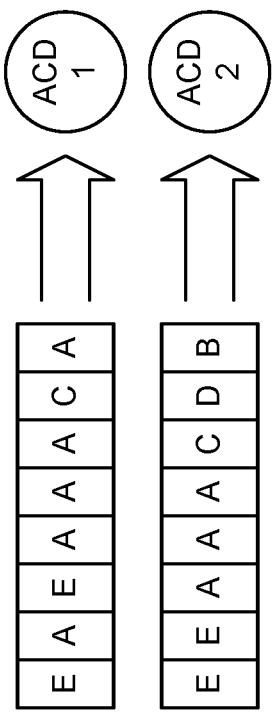
FIG. 8A
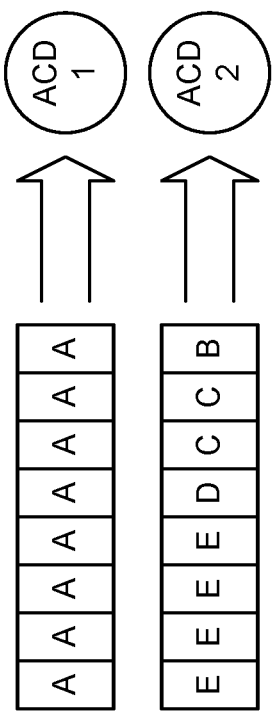
FIG. 8B
| Syscall | Arrival Time | Finish Time (existing scheme) | Response Time (existing scheme) | Finish Time (Optimized scheme) | Response Time (Optimized scheme) |
|---|---|---|---|---|---|
| A | 0 | 8 | 8 | 7 | 7 |
| B | 0 | 1 | 1 | 1 | 1 |
| C | 1 | 3 | 2 | 3 | 2 |
| D | 1 | 4 | 3 | 2 | 1 |
| E | 6 | 8 | 2 | 8 | 2 |
| Total | N/A | N/A | 16 | N/A | 13 |
FIG. 8C

METHOD AND APPARATUS FOR OPTIMIZING SYSTEM CALL (SYSCALL) PROCESSING

FIELD

This disclosure relates to computing systems and related devices and methods, and, more particularly, to a method and apparatus for optimizing system call (syscall) processing in a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Management applications implement management operations on a storage system by passing system calls (syscalls) to a management system. In some embodiments, all management traffic is passed from one or more instances of a management application to a management daemon executing in the context of the storage system operating system. The management daemon sorts syscalls received from the management applications into First In First Out (FIFO) queues and, when there is an available array control device, selects a syscall from one of the FIFO queues, and spawns a thread on the available array control device to service the selected syscall.

The management system has a syscall scheduler configured to optimize handling of syscalls, by breaking long running syscalls into discrete operations, implementing a portion of the syscall, and then stopping operation of the syscall while saving the state of the partially executed syscall. The partially executed syscall is placed back into a queue for subsequent operation, thus freeing up the array control devise for use in connection with other syscalls. By optimizing syscall scheduling, and incrementally processing long running syscalls, it is possible to reduce the overall syscall processing time for a set of syscalls, thus effectively reducing the total number of array control devices that are required to be configured for management traffic on a storage system.

BRIEF DESCRIPTION OF THE DRAWINGS

FIG. 7A is a functional block diagram showing a set of syscalls executed on a single array control device, sequenced using a conventional syscall scheduling process.

FIG. 7B is a functional block diagram showing a set of syscalls executed on a single array control device, sequenced using an optimized syscall scheduling process, according to some embodiments.

FIG. 7C is a table comparing the response time of the conventional syscall scheduling process and the response time of the optimized syscall scheduling process for the example set of syscalls executed on a single array control device, according to some embodiments.

FIG. 8A is a functional block diagram showing a set of syscalls executed on two array control devices, sequenced using a conventional syscall scheduling process.

FIG. 8B is a functional block diagram showing a set of syscalls executed on two array control devices from a single queue, sequenced using an optimized syscall scheduling process, according to some embodiments.

FIG. 8C is a table comparing the response time of the conventional syscall scheduling process and the response time of the optimized syscall scheduling process for the example set of syscalls executed on two array control devices, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
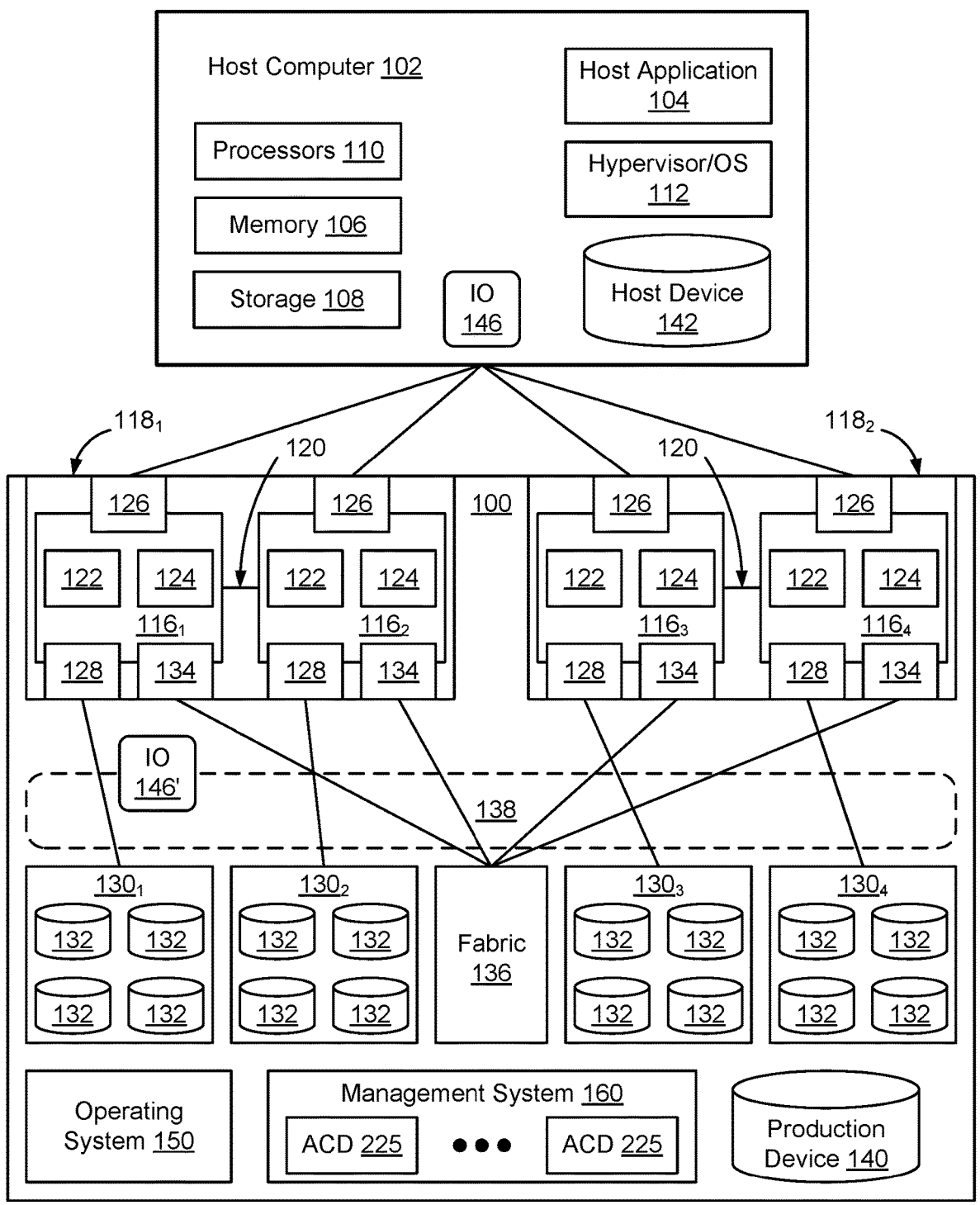
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Storage systems 100 provide storage services for hosts 102. Management system 160 implements management operations on the storage system to configure operation of the storage system for use by the hosts 102, by passing system calls (syscalls) to an operating system 150 controlling operation of the storage system 100. Syscalls are a set of primitive operations defined for handling management traffic between a control host and an array (storage system 100). All control and management tasks are reduced and implemented through some sequence of syscalls. Example management operations might be, for example, to create a logical storage volume, or to cause the storage system to provide a list of logical storage volumes. Storage systems are complex systems, and a large set of syscalls has been developed allowing users to accomplish many tasks, ranging from simple status queries, configuration of storage resources, to sophisticated operations that are used in various data protection features.

Figure 2:
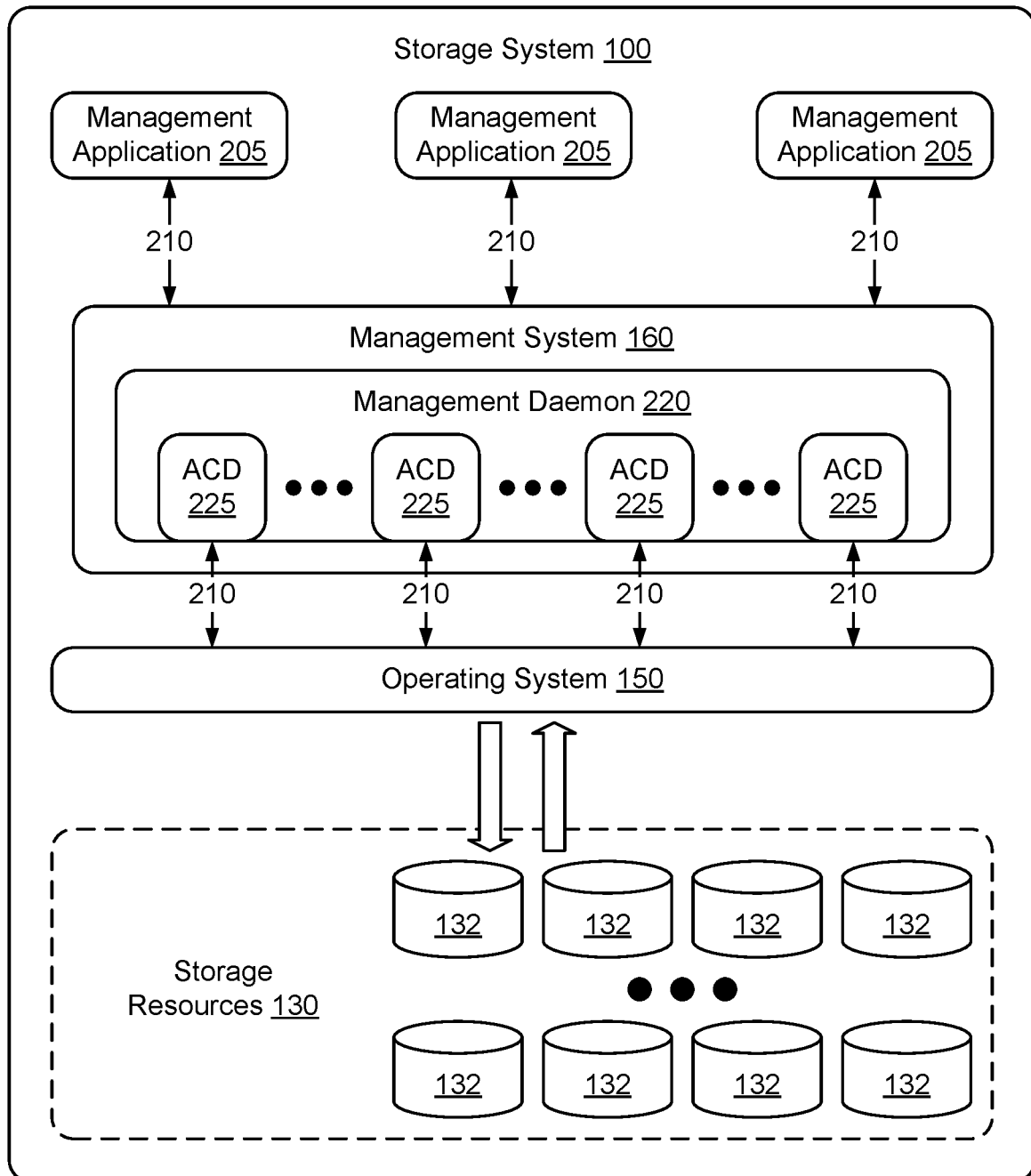
FIG. 2 is a functional block diagram of an example storage system showing aspects of the management processes in greater detail, according to some embodiments.

FIG. 2 is a functional block diagram of an example storage system showing aspects of the management processes in greater detail, according to some embodiments. As shown in FIG. 2, in some embodiments management applications 205 generate syscalls 210 that are sent to management system 160 to implement management operations on the storage system 100 to configure operation of the storage system 100.

In some embodiments, syscalls 210 generated by the management applications 205 are passed to a management daemon 220 implemented as part of the management system 160. A "daemon" as that term is used herein, is used to refer to a background process operating in the context of the storage system operating system 150 that is not under the direct control of an interactive user. In a Unix environment, the parent process of a daemon is often, but not always, the init process. Although the description will refer to the background process used by management system 160 as a "daemon" other background processes may be used as well, such as Windows Services, depending on the implementation.

In some embodiments, the management daemon 220 manages communication between a control host (management application 205) and the storage system arrays. Syscalls from the management applications 205 are forwarded to management daemon 220 where they are processed and sent out to target arrays. Once syscall results are returned from the array, the management daemon 220 sends the results to syscall callers. In addition to managing all syscalls 210, the management daemon 220 is also responsible for discovering the reachability and topology of the arrays.

In some embodiments, the management daemon 220 receives syscalls 210 from the management applications 205 and implements the syscalls using one or more array control devices 225. Array Control Devices (ACDs) are operating system devices. An array control device may be implemented, for example, as a SCSI device that is created by the operating system and mapped and masked to the host process. The array control devices are special target devices configured on external control hosts for sending management commands to the storage system operating system 150 and receiving information from the storage system. For example, in some embodiments the management daemon issues write operations on the array control devices, which are received by the operating system 150. By using array control devices 225, it is possible to encapsulate management traffic in SCSI commands, and then transmit the management traffic in-band over SCSI links between the host and storage system. Using array control devices thus enables the management traffic to re-use the software infrastructure developed for SCSI IOs, to thus avoid the development of a separate software stack for management traffic.

However, relying on array control devices 225 for management traffic also means that it is necessary to configure and manage those special devices, which adds extra work to customers. In an era of providing observability into an array of millions of devices with a rich set of data protection, automation, and AI features, management traffic has been steadily growing. Multiple array control devices must therefore be configured to handle syscalls in parallel, to provide higher throughput and the level of concurrency required by management software features.

In many host operating systems, however, the number of devices that can be mapped to a host is a limited resource at any time. Using more devices for management traffic means fewer available devices that can be configured to be used for user IO for the host or upper layer software. This becomes a bigger issue in a virtualized environment when multiple virtual machines are running on the same physical host, because in some instances each virtual machine may need to be configured with its own directly mapped array control device 225.

According to some embodiments, management applications implement management operations on a storage system by passing system calls (syscalls) to a management system. In some embodiments, all management traffic is passed from one or more instances of a management application to a management daemon executing in the context of the storage system operating system. The management daemon sorts syscalls received from the management applications into First In First Out (FIFO) queues and, when there is an available array control device, selects a syscall from one of the FIFO queues, and spawns a thread on the available array control device to service the selected syscall.

The management system has a syscall scheduler configured to optimize handling of syscalls, by breaking long running syscalls into discrete operations, implementing a portion of the syscall, and then stopping operation of the syscall while saving the state of the partially executed syscall. The partially executed syscall is placed back into a queue for subsequent operation, thus freeing up the array control devise for use in connection with other syscalls. By optimizing syscall scheduling, and incremental processing of long running syscalls, it is possible to reduce the overall syscall processing time for a set of syscalls, thus effectively reducing the total number of array control devices that are required to be configured for management traffic on a storage system.

Figure 3:
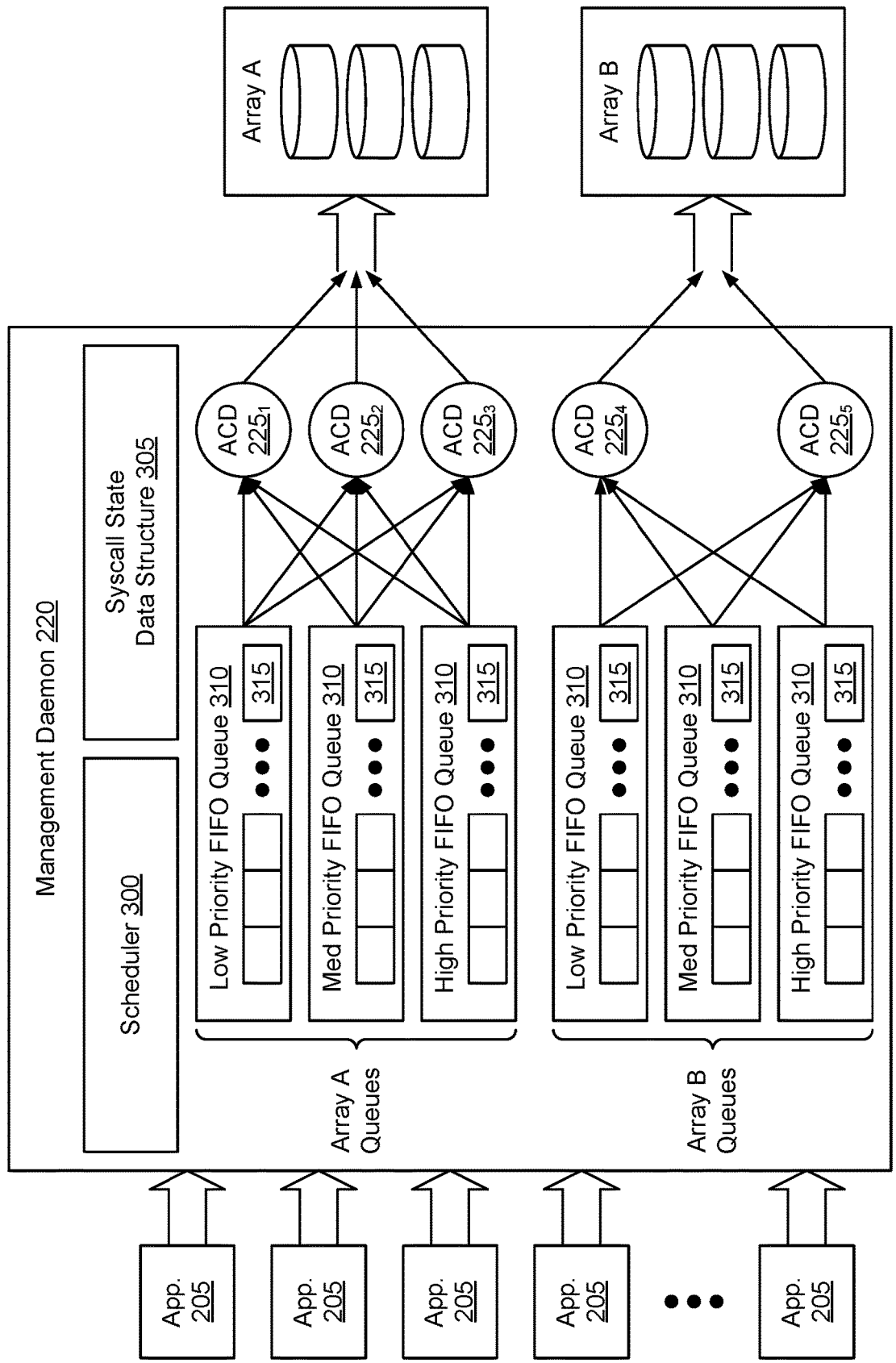
FIG. 3 is a functional block diagram of an example management daemon configured to handle storage system management operations in a storage system such as the storage system of FIG. 1, according to some embodiments.

FIG. 3 is a functional block diagram of an example management daemon configured to handle storage system management operations in a storage system such as the storage system of FIG. 1, according to some embodiments. As shown in FIG. 3, in some embodiments the management daemon 220 has a scheduler 300 and a syscall state data structure 305.

Applications 205 send syscalls to the management daemon 220 where they are placed into FIFO queues. For example, the management daemon 220 might have low, medium, and high priority FIFO queues 310. In the example shown in FIG. 3, the management daemon 220 is configured to implement syscalls on two arrays (Array A and Array B). Five array control devices 225 are shown in FIG. 3, of which array control devices $225_1$, $225_2$, and $225_3$, are used by the management daemon to implement syscalls on Array A, and array control devices $225_4$ and $225_5$ are used to implement syscalls on Array B.

For each target array, a syscall scheduler 300 periodically selects an available array control device to serve a syscall from one of the FIFO queues 310 for that array. Although FIG. 3 shows a single instance of scheduler 300, in some embodiments a separate instance of scheduler 300 may be used to schedule syscalls for each of the arrays.

Depending on the amount of data processed, the execution time of syscalls varies. Some syscalls need only one round of data exchange in the SCSI layer between a host and an array, while others may need multiple rounds of data exchanges. For simplicity, syscalls that need multiple rounds of data exchanges will be called long running syscalls as they need more time to be executed. Examples of long running syscalls include syscalls configured to collecting statistics for large number of devices or other management objects. Because syscalls are served in the order of their arrival time, long running syscalls may hold an array control device for an extended period and leave other syscalls waiting in the FIFO queues while the long-running syscall executes. In some cases, this can cause timeouts for those other syscalls. For example, in some embodiments the array will return requested data in chunks having a size of 64 K. If a syscall requests a significant amount of data, for example that might be on the order of 1 M, the syscall may require the management daemon 220 to repeatedly use the array control device 225 fifteen to twenty times to obtain all the required data, thus blocking execution of other syscalls on that array control device 225.

According to some embodiments, an optimized syscall scheduling process is provided that is configured to improve the efficiency of the existing array control device scheduling. In some embodiments, syscalls are automatically classified and processed to achieve the total minimum response time. Specifically, long running syscalls are paused and the state of the syscall saved, to allow the array control devices to process other syscalls, and then to return to the long-running syscall. This decreases the overall processing time required for a set of syscalls, by reducing the amount of time other syscalls pend before obtaining access to an array control device. Where the management system 160 is tasked with providing a particular service level to the set of syscalls, this means that the management system 160 is able to meet the overall service level with fewer array control devices 225, thus reducing the number of access control devices 225 required to be configured for management traffic on a control host.

In some embodiments, by improving the efficiency of the scheduler 300, it is possible to reduce the overall mean response time for a set of syscalls. As used herein, the term response time is used to refer to the difference between a syscall arrival time and its finish time. The arrival time of a syscall is the time it is submitted to the management daemon 220 and either sent to an array control device 225 or placed in a queue 310. The finish time of a syscall is the time the management daemon 220 returns the syscall result to the submitting application 205. By partitioning the execution of long running syscalls into multiple smaller steps, and re-ordering syscall execution, the scheduler prevents long running syscalls from holding array control devices 225 for an extended period of time, which can then be used to service other syscalls that are waiting in the FIFO queues 310. This enables the response time for a set of syscalls to be reduced overall, which enables a reduce set of array control devices to be used to process syscalls while maintaining the same mean response time as was possible using the conventional syscall scheduling process.

For example, let S be a set of syscalls to be served, $T_i$ to be the response time for syscall i, $\alpha_i$ be the arrival time of syscall i, and $f_i$ be the finish time of syscall i, where $T_i = f_i - \alpha_i$. The objective of an efficient scheduler is to find a schedule with mean response time T for the set of syscalls:

Minimize $T = \Sigma_{i \in S}(f_i - \alpha_i)$ subject to: $f_i - \alpha_i < D$ and: $\Sigma_{i \in S} M_i \leq O(|S|)$ where D is a constant. The first constraint ensures every syscall is eventually executed. The second constraint is introduced because we are looking for an efficient algorithm that is fast to run with little overhead. $M_i$ is the number of extra operations, e.g. steps in searching and sorting, need to execute syscall i, and |S| the number of all data exchanges to execute a set of syscalls. The total amount of extra work introduced by the new scheduling scheme cannot be greater than a linear function of the set of syscalls to serve.

Figure 4:
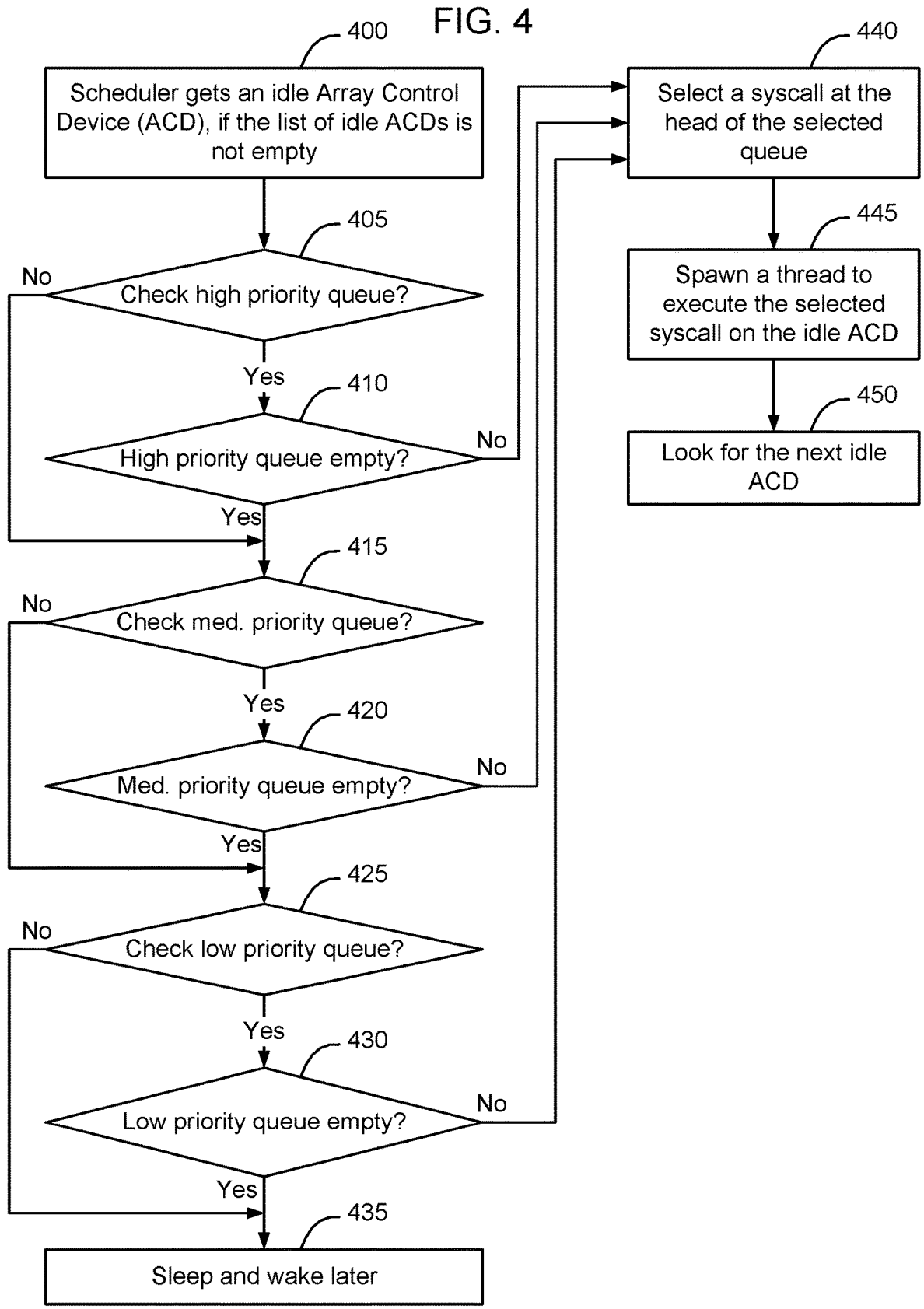
FIG. 4 is a flow chart of a process used by the management daemon to select a syscall for processing on an array control device, according to some embodiments.
Figure 5:
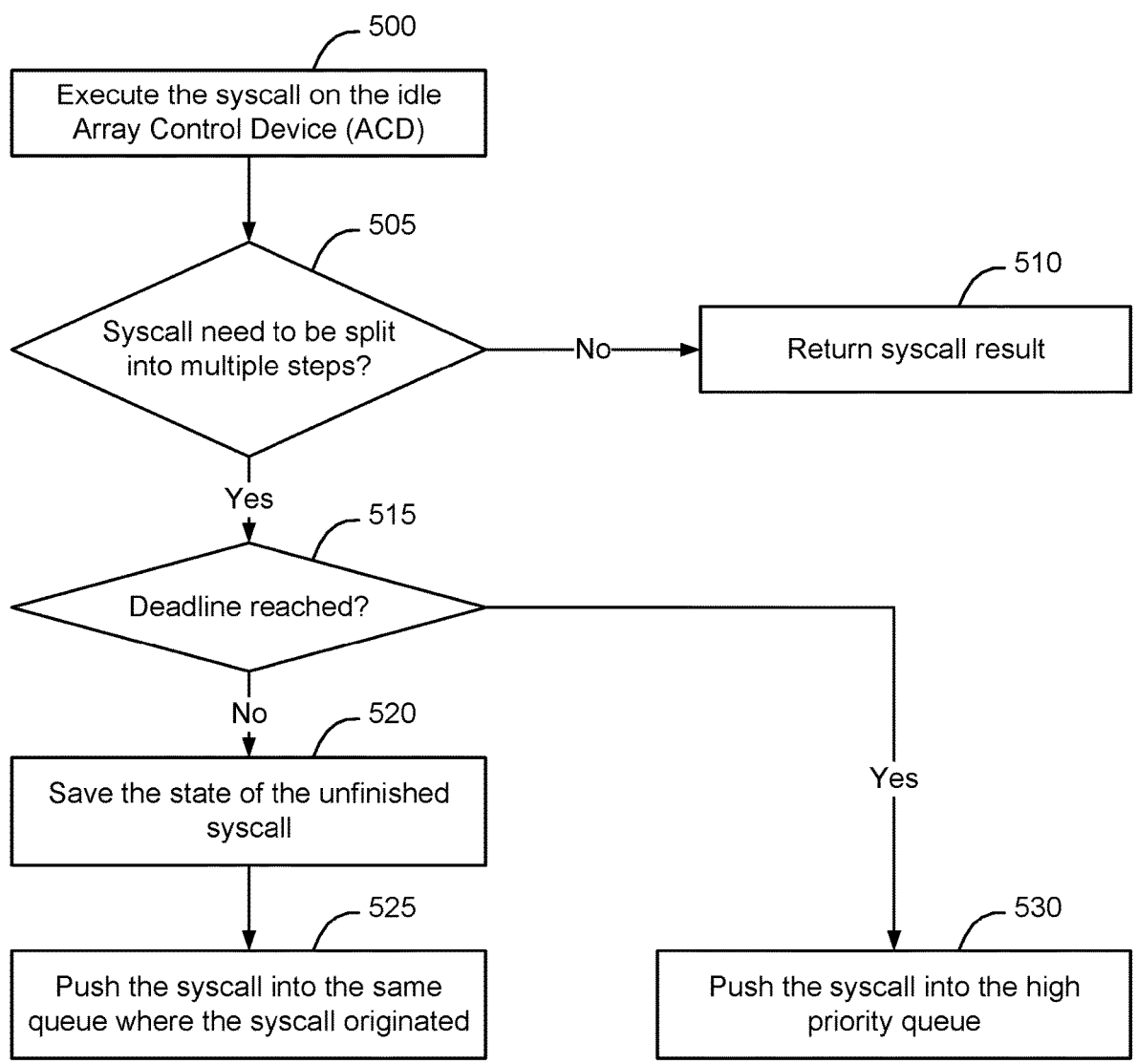
FIG. 5 is flow chart of a process of dynamically managing operation of a syscall by the management daemon of FIG. 3, according to some embodiments.
Figure 6:
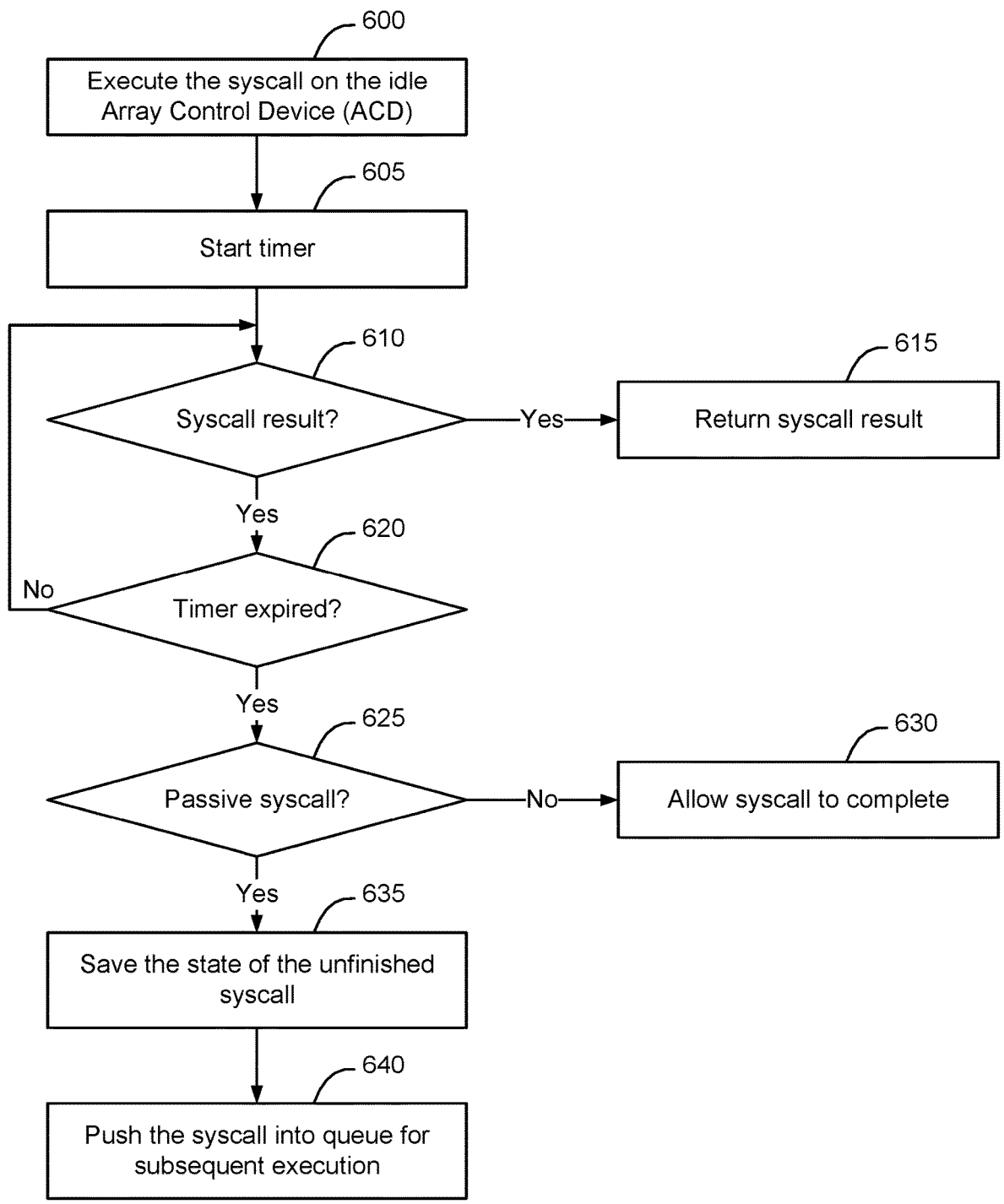
FIG. 6 is flow chart of another process of dynamically managing operation of a syscall by the management daemon of FIG. 3, according to some embodiments.

The scheduler keeps a list of idle array control devices 225, i.e., array control devices 225 that are not serving any syscalls. As shown in FIGS. 4-6, there are two parts of the heuristic algorithm to minimize the mean response time associated with processing a set of syscalls.

The first part of the algorithm is that the scheduler goes through a list of idle array control devices 225 and serves the syscalls in FIFO queues (see FIG. 4). The scheduler repeatedly services the three FIFO queues, with high, medium and low priority respectively. In some embodiments, priority is accomplished by assigning a different weight to each queue so none of the queues will be starved.

In the second part of the algorithm, the scheduler spawns a task to process a syscall on a selected idle array control device. The execution of a long running syscall includes multiple rounds of data exchanges between a host and an array in the SCSI layer. Instead of executing a syscall until it is completed, the scheduler checks if the execution of a syscall exceeds an allowed interval. If the syscall execution has exceeded an allowed interval, and the syscall is a passive syscall (e.g. not configuring execution of the array), it is possible to stop execution of the syscall, save the state of the syscall, and return to continue processing the syscall at a later point in time. According to some embodiments, if implementation of the syscall is not complete, and if execution of the syscall is able to be paused, the scheduler 300 saves the state of the unfinished syscall in the syscall state data structure 305. The scheduler 300 checks if the deadline is approaching to decide where to place the unfinished syscall. The scheduler puts the remaining syscall into the high priority queue if the deadline for completion of the partially completed syscall is pending, or the same queue where the syscall was previously stored if the deadline is not pending. This prevents pending syscalls from being timed out. For example, if a long running syscall was initially selected from the low priority FIFO queue, and execution of the syscall is paused, the partially completed syscall will be placed back into the end of the low priority FIFO queue unless the partially completed syscall is about to be timed out.

This optimized algorithm partitions the execution of a long running syscall into multiple smaller steps, suspending the execution of the long running syscalls temporarily, and making the array control devices 225 available to be used to implement other syscalls waiting in the FIFO queues 310.

Note that the optimized scheduler moves the unfinished syscall to the end of a queue of choice to reorder syscall execution and, by doing so, reduce the mean response time for the overall set of syscalls. Because no syscall can hold an array control device 225 extensively, other syscalls may be executed sooner than they would be in the existing scheduler. The extra work to reorder syscalls is only needed for long running syscalls and the total number of times that a long running syscall can be requeued is, in the worst case, proportional to the size of the syscall. Thus, the mean response time of the scheduler is minimized within constraints.

The optimization requires an extra amount of memory to implement the syscall state data structure 305 used to store the state of unfinished syscalls, which is needed when the syscalls are executed again as well as recovery from various failures. Specifically, as shown in FIG. 3, the management daemon 220 implements a syscall state data structure 305 that is configured to store the state of the syscall at the time operation of the syscall was suspended. When a suspended syscall returns to the head of the FIFO queue 310 and is picked up again for implementation on an array control device, the state of the syscall is retrieved from the syscall state data structure 305 and passed to the thread spawned to execute the syscall on the array control device, to thus enable execution of the syscall to pick up where it had previously left off. A given syscall may be selected and implemented on any available array control device multiple times, each time having the syscall state saved in the syscall state data structure 305, before the syscall is finally completed and the result of the syscall returned to the application 205. For example, a long-running syscall may be selected form a low priority queue, implemented on array control device $225_1$, sent back to the low priority queue, then sent to array control device $225_3$, sent back to the low priority queue, and finally sent to and completed by array control device $225_2$.

FIG. 4 is a flow chart of a process used by the management daemon to select a syscall for processing on an array control device, according to some embodiments. In some embodiments, the scheduler maintains a list of idle array control devices. For example, when an array control device is used to process a syscall, and returns the result of the syscall, the array control device is returned to an idle state and is able to be used for a subsequent syscall. Accordingly, when the scheduler determines that there is an idle array control device (block 400) the scheduler will select a syscall for the idle array control device from one of the FIFO queues 310.

In some embodiments, the management daemon scheduler applies weights to the high, medium, and low FIFO queues 310 to ensure that none of the queues are starved. The weights are used to determine whether a syscall should be selected from a given queue, based on the recent history of selection of syscalls from the set of queues. As shown in FIG. 4, in some embodiments the scheduler determines whether it should select a syscall from the high priority queue (block 405). If the high priority FIFO queue is due to have a syscall selected for processing (a determination of YES at block 405) the scheduler determines if the high priority queue is empty (block 410). If the high priority queue is not empty (a determination of NO at block 410) a syscall at the head of the high priority FIFO queue is selected for processing (block 440).

If the high priority queue is empty (a determination of YES at block 410) or if the scheduler is not due to select a syscall from the high priority queue (a determination of NO at block 405), the scheduler determines whether it should select a syscall from the medium priority queue (block 415). If the medium priority FIFO queue is due to have a syscall selected for processing (a determination of YES at block 415) the scheduler determines if the medium priority queue is empty (block 420). If the medium priority queue is not empty (a determination of NO at block 420) a syscall at the head of the medium priority FIFO queue is selected for processing (block 440).

If the medium priority queue is empty (a determination of YES at block 420) or if the scheduler is not due to select a syscall from the medium priority queue (a determination of NO at block 415), the scheduler determines whether it should select a syscall from the low priority queue (block 425). If the low priority FIFO queue is due to have a syscall selected for processing (a determination of YES at block 425) the scheduler determines if the low priority queue is empty (block 430). If the low priority queue is not empty (a determination of NO at block 430) a syscall at the head of the low priority FIFO queue is selected for processing (block 440).

If there are no syscalls in any of the queues, the scheduler sleeps and wakes at a later point to check to see whether any syscalls have arrived for processing (block 435). Although FIG. 4 shows the some embodiments in which there are three queues, a different number of queues may be maintained by the management daemon 220 depending on the implementation. Once a syscall has been selected, (block 440) a thread is spawned to execute the syscall on the idle array control device (block 445). The scheduler then returns to look for a subsequent idle array control device (block 450). When a subsequent idle array control device is located, the process returns to block 400 and the process of selecting a syscall for implementation on the idle array control device repeates.

FIG. 5 is flow chart of a process of dynamically managing operation of a syscall by the management daemon of FIG. 3, according to some embodiments. As shown in FIG. 5, in some embodiments, once a syscall has been selected from one of the FIFO queues, the selected syscall is executed on the idle array control device 225 (block 500). A determination is then made if the syscall needs to be split into multiple steps (block 505). Additional details about conditions that may warrant splitting a syscall into multiple steps are provided in connection with FIG. 6. If the syscall does not need to be split into multiple steps (a determination of NO at block 505), the scheduler 300 waits for the syscall result and, when the syscall result is received, returns the syscall result to the requesting management application (block 510).

If the scheduler determines that the syscall needs to be split into multiple steps (a determination of YES at block 505), the scheduler determines whether the syscall is approaching a timeout deadline (block 515), If the syscall is not close to the deadline (a determination of NO at block 515), the state of the syscall is saved in the syscall state data structure 305 (block 520), and the syscall is pushed onto the end of the FIFO queue from which it originated (block 525). For example, if the syscall was selected from the low priority FIFO queue, and the syscall is not close to the execution deadline, the syscall will be pushed back onto the end of the low priority FIFO queue. Likewise, if the syscall was selected from the medium priority FIFO queue or from the high priority FIFO queue, and the syscall is not close to its execution deadline, the syscall will be pushed back onto the end of the medium priority FIFO queue or back onto the end of the high priority FIFO queue, respectively. If the deadline for completion of the selected syscall is near (a determination of YES at block 515) in some embodiments the syscall is placed onto the high-priority queue to enable execution of the syscall to be prioritized.

FIG. 6 is flow chart of another process of dynamically managing operation of a syscall by the management daemon of FIG. 3, according to some embodiments. As shown in FIG. 6, in some embodiments determining whether a syscall should be split into multiple parts is implemented using a dynamic process that is at least in part based on how long it is taking to execute a selected syscall. The amount of time it takes to execute a syscall can be affected by multiple factors, such as the overall amount of work being implemented by the operating system, the size of the syscall, and numerous other factors. In some instances the type of syscall is known in advance that it is likely to be a long-running syscall, due to the number of data exchanges required to implement the syscall. In other instances, a syscall may take an excessive amount of time to execute, which may require the syscall to occupy the array control device for an extended period of time, thus blocking execution of other syscalls on the array control device.

In some embodiments, as shown in FIG. 6, when a syscall is selected for execution on an idle array control device (block 600) a timer is started (block 605). The timer may be a countdown timer or a countup timer. A determination is then made as to whether the syscall result has been received (block 610) before expiration of the timer (block 620). If the syscall result is received before expiration of the timer (a determination of YES at block 610), the syscall result is returned (block 615) and the syscall does not need to be split into multiple steps.

If the syscall result is not returned before expiration of the timer (a determination of NO at block 610 and a determination of YES at block 620) a determination is made as to whether the syscall is a passive syscall (block 625). Some syscalls are active syscalls, in that they change the configuration of the underlying storage system. Example active syscalls might be, for example, syscalls designed to create storage volumes on the storage system. As used herein, the term "active" syscall will be used to refer to a syscall that is not allowed to be split into multiple parts. By contrast, some syscalls are passive, in that they do not change the configuration of the underlying storage system but rather simply obtain information from the underlying storage system. An example passive syscall might be, for example, a syscall designed to request the operating system to provide a list of all storage volumes that have been created on the storage system. Since a passive syscall does not change the configuration of the underlying storage system, execution of a passive syscall can be stopped, the state of the syscall saved, and then execution of the passive syscall can be resumed at a later point in time.

Accordingly, as shown in FIG. 6, in some embodiments a determination is made as to whether the nature of the syscall is such that it is possible to execute the syscall in multiple parts (block 625). If the syscall is an active syscall and cannot be executed in multiple parts (a determination of NO at block 625) the syscal is allowed to complete execution on the selected array control device (block 630). If the syscall is a passive syscall that is able to be executed in multiple parts (a determination of YES at block 625), the state of the unfinished syscall is saved in the syscall state data structure 305 (block 635) and the syscall is pushed back onto a selected FIFO queue for subsequent execution (block 640), for example as shown in FIG. 5, blocks 515-530. A given syscall may be partially executed multiple times prior to completion, depending on the length of the long-running syscall, the state of the underlying operating system, the number of other syscalls in the set of FIFO queues, and numerous other factors.

FIG. 7A is a functional block diagram showing a set of syscalls executed on a single array control device, sequenced using a conventional syscall scheduling process. FIG. 7B is a functional block diagram showing a set of syscalls executed on a single array control device, sequenced using an optimized syscall scheduling process, according to some embodiments. FIG. 7C is a table comparing the response time of the conventional syscall scheduling process and the response time of the optimized syscall scheduling process for the example set of syscalls executed on a single array control device, according to some embodiments.

FIGS. 7A and 7B illustrate how a conventional scheduler (FIG. 7A) and an optimized scheduler (FIG. 7B) work for a single array control device 225 serving a single FIFO queue 310. In the example shown in FIGS. 7A and 7B, it is assumed that there are five syscalls, labeled A, B, C, D and E to be served, and all array control devices 225 are busy when they arrive so all of the syscalls are placed in the FIFO queue 310. The time of arrival of the example set of syscalls is shown in Col 2 of the table shown in FIG. 7C. Further, assume the execution time for syscalls are in the multiples of some unit of time (where one unit of time can be one or multiple round trips of data exchange in the SCSI layer). In the example shown in FIGS. 7A and 7B, syscall A will take eight units of time, syscalls B and D each take one unit of time, syscall C takes two units of time, and syscall E takes four units of time to execute, respectively.

FIG. 7A shows execution of the syscalls from the FIFO queue using a conventional scheduler and a single array control device. As shown in FIG. 7A, conventionally syscall A would be selected to execute on the array control device 225, and would execute until completion. Since syscall A requires 8 units of time to complete, syscalls B, C, D, and E would all wait until syscall A has completed execution, before being provided with access to the array control device 225.

As shown in FIG. 7A, using a conventional scheduling process, syscalls are executed in the order of their arrival time and execute to completion. Syscalls B, C, D and E can only be executed after syscall A finishes. This means the response time for Syscalls B, C, D and E is affected by the long running syscall A.

FIG. 7B shows execution of the syscalls from the FIFO queue using a optimized scheduler and a single array control device. As shown in FIG. 7B, unlike the conventional scheduler, the optimized scheduler executes one part of syscall A first, and puts it into the queue after syscalls B, C and D (because they arrive before the first part of syscall A finishes). Then, syscalls B, C and D are executed in turn, and the remaining part of syscall C is put back to the queue. Then another part of syscall A gets executed again, followed by the remaining part of syscall C. After some time, syscall E arrives, and then gets executed in parts, similar to syscall A. The response time for syscalls B, C and D have been improved. The response time for syscall E is the same as before. While the response time for A degrades, but the mean response time for all syscalls is improved.

FIG. 7C is a table showing the response time for all syscalls, and comparing a conventional scheduler with the optimized scheduler. In addition to assuming that the execution each syscall is a multiple of units of time, it is assumed that all syscalls arrive and finish at integer instants of time. The second column shows the arrival time of every syscall, so syscall A arrives at time 0, syscalls B, C and D arrive at time 1 etc. The third column shows the finish time of every syscall. For example, in the conventional scheduler syscall A finishes at time 8 because it takes 8 units of time to execute it. The fourth column shows the response time for each syscall, which the difference between its finish time and its arrival time. The fifth column shows the finish time under the optimized scheduler. The last column shows the response time under the optimized scheduler.

Figure 11:
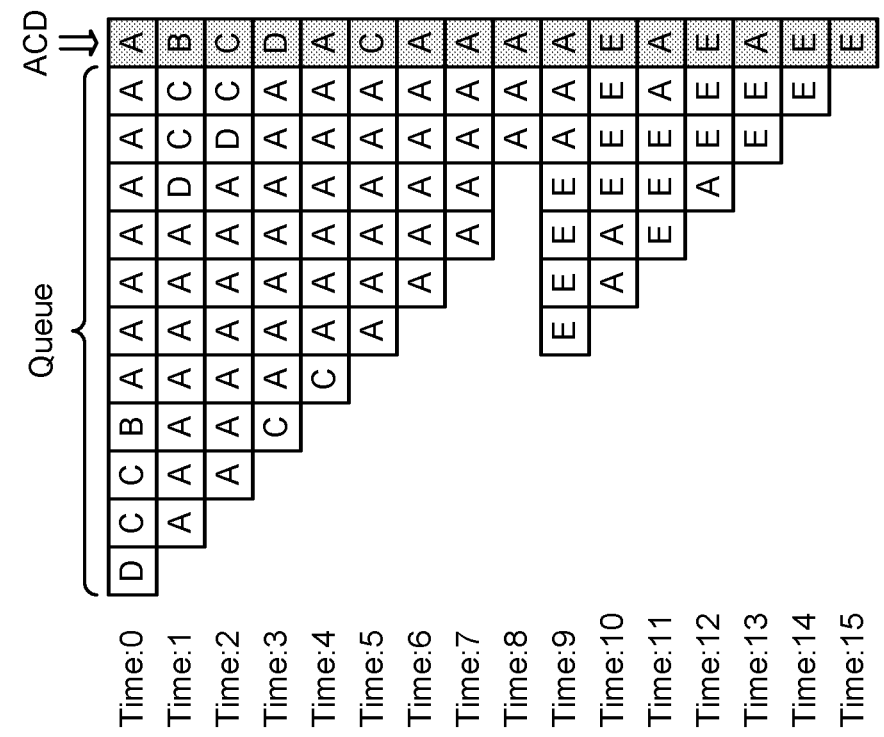
FIGS. 11 and 12 are timelines showing syscall processing of the conventional syscall scheduling process and the optimized syscall scheduling process, respectively.
Figure 12:
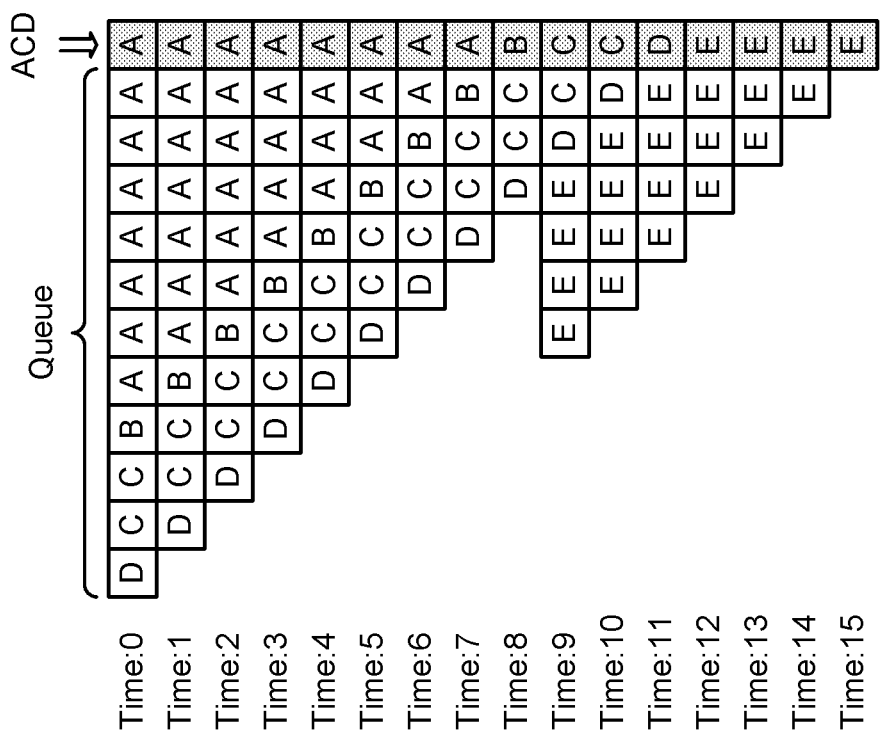

FIGS. 11 and 12 show a single queue and a single ACD, and show how the queue evolves over time for both the conventional syscall scheduling process (FIG. 11) and the optimized syscall scheduling process (FIG. 12). As shown in these figures, the optimized syscall scheduling process is able to accelerate removal of syscalls B, C, and E from the queue, at the sacrifice of a slower response time for syscall A.

In the example shown in FIGS. 7A and 7B, the total response time for all syscalls is 44 units of time for the existing scheduling scheme, and 30 units of time for the optimized scheduling scheme. In this example, there is about 30% improvement of the mean response time, when compared with the optimized scheduling scheme.

FIG. 8A is a functional block diagram showing a set of syscalls executed on two array control devices, sequenced using a conventional syscall scheduling process. FIG. 8B is a functional block diagram showing a set of syscalls executed on two array control devices, sequenced using an optimized syscall scheduling process, according to some embodiments. FIG. 8C is a table comparing the response time of the conventional syscall scheduling process and the response time of the optimized syscall scheduling process for the example set of syscalls executed on two array control devices, according to some embodiments.

FIGS. 8A and 8B illustrate how a conventional scheduler (FIG. 8A) and an optimized scheduler (FIG. 8B) work for two array control devices 225 serving a single FIFO queue 310. Assume there are five syscalls A, B, C, D and E to be served and all array control devices 225 are busy when they arrive so all of the syscalls are placed in the FIFO queue 310. Further, assume the execution time for syscalls are in the multiples of some unit of time (where one unit of time can say one or multiple round trips of data exchange in SCSI layer). In the example shown in FIGS. 8A and 8B, syscall A will take eight units of time, syscalls B and D each take one unit of time, syscall C takes two units of time, and syscall E takes four units of time to execute, respectively.

As shown in FIG. 8A, in the conventional scheduler syscalls are executed in the order of their arrival time. Because there are two array control devices 225, one serves syscall A while the other serves syscalls B, C, D and E.

In comparison, as shown in FIG. 8B, the optimized scheduler executes one part of syscall A first, and then puts syscall A into the queue after syscalls B, C and D (because they arrive before the first part of syscall A finishes). Then, parts of syscalls B, C, D and E are executed on one of the array control devices 225. Note that with two array control devices 225, the mean response time for all syscalls is improved.

In some embodiments, is it possible for different portions of a given syscall to be executed on two array control devices at the same time. For example, as shown in FIG. 8B, different portions of syscall A are able to be executed on both array control devices at the same time at time T=4 and T=5, and different portions of syscall E are able to be executed on both array control devices at the same time at time T=8.

FIG. 8C is a table showing the response time for all syscalls. The second column shows the arrival time of every syscall, so syscall A arrives at time 0, syscalls B, C and D arrive at time 1 etc. The third column shows the finish time of every syscall for the conventional syscall scheduler. For example, in the conventional syscall scheduling process, syscall A finishes at time 8 because it takes 8 units of time to execute it. The fourth column shows the response time for each syscall for the conventional scheduler, which the difference between its finish time and its arrival time. The fifth column shows the finish time for each syscall under the optimized scheduler. The last column shows the response time for each syscall under the optimized scheduler.

The total response time for all syscalls is 16 units of time for the existing scheduling scheme and 13 units of time for the optimized scheduling scheme. In this example, there is about 18% improvement of the mean response time with the optimized scheduling scheme.

Figure 9:
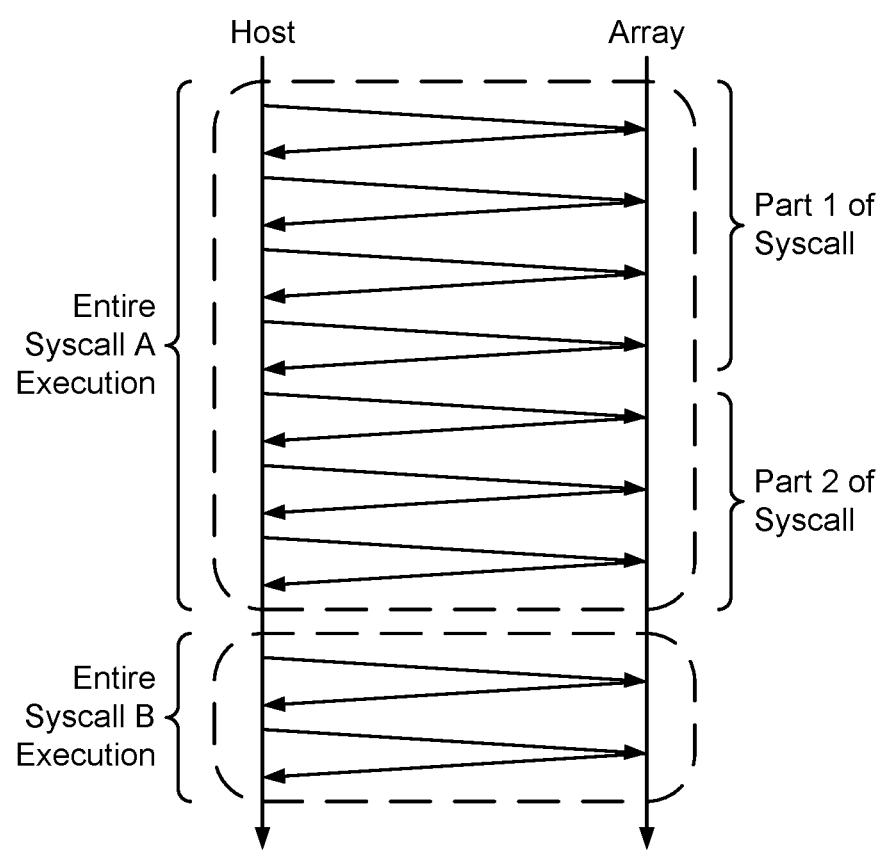
FIG. 9 is a functional block diagram showing execution of two syscalls using a conventional syscall scheduling process.
Figure 10:
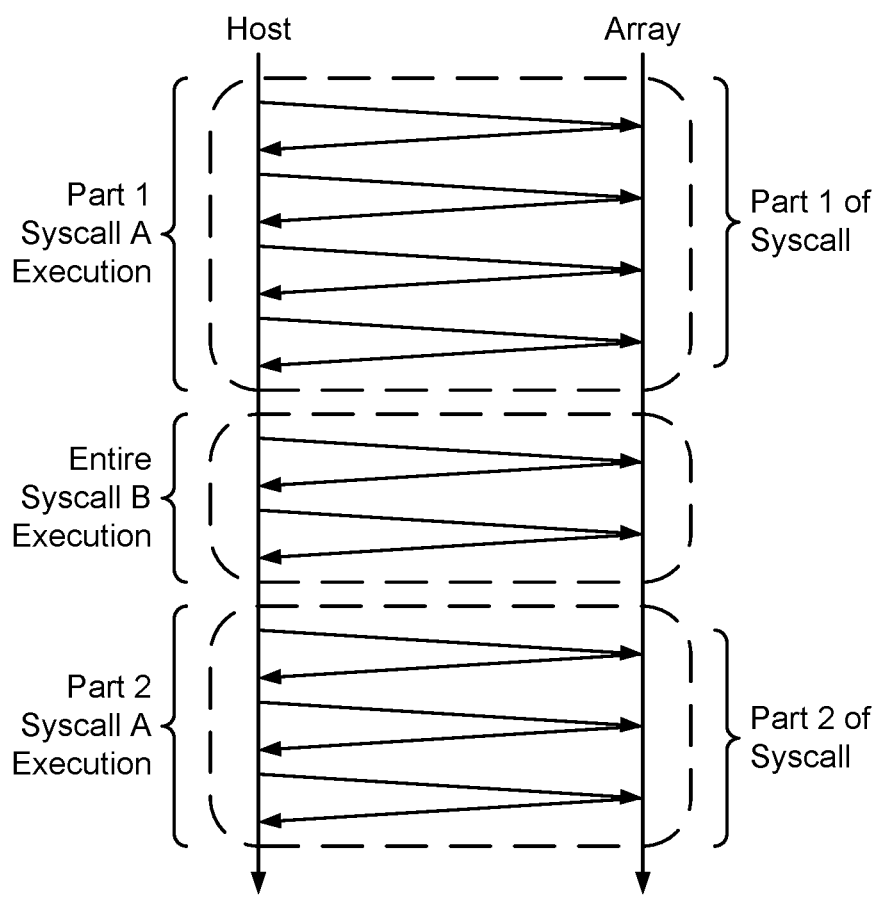
FIG. 10 is a functional block diagram showing execution of the two syscalls of FIG. 9 using an optimized syscall scheduling process, according to some embodiments.

FIGS. 9 and 10 show the timeline of the execution of two syscalls on a single array control device, under the existing and new scheme respectively. In both diagrams, the execution of each syscall is comprised of multiple data exchanges in SCSI layer. Arrows represent data exchanges between a control host and an array in SCSI layer. Under the existing scheme shown in FIG. 9, a syscall is executed in its entirety before the next syscall can be executed. In the optimized scheme shown in FIG. 10, the management daemon 220 determines whether a syscall is taking too long, and if so partitions execution of the syscall into smaller execution pieces. In FIG. 10, the first syscall is partitioned into two parts. The first part is executed first, the remaining parts are saved temporarily, the second syscall is executed, and then the remaining parts of the first syscall are executed.

In some embodiments, the management daemon 220 does not know, in advance, how much time it will take to execute a syscall. The execution time of a syscall is dependent on several factors, the speed of hardware, link bandwidth, the configuration (size) of the array, and workload on the host and array. Choosing a threshold to partition larger syscalls is a tradeoff between mean response time and efficiency. Choosing a shorter time threshold for partitioning syscalls will result in generation of more overhead, because execution of a given syscall may take a larger number of steps, and partitioning a larger number of syscalls will require and more space to store the unfinished syscall state. On the other hand, choosing a larger time threshold may not improve the mean response time.

In some embodiments, a threshold is chosen based on the statistical data collected from arrays running with typical workload to ensure that 99% of the regular syscalls can be completed within the threshold time (FIG. 6, block 620). The testing results show that the percentage of syscalls timed out significantly decreases with a properly selected threshold. The reduction of mean response time for syscalls diminishes when the threshold gets larger, because fewer and fewer syscalls would be partitioned into multiple steps of execution.

In some embodiments, since the execution time of each SCSI commands may be affected by multiple factors, the threshold may be adjusted over time according to the change of long-term workload pattern of the array.

There are syscall types that by definition take multiple units of time to execute. In some embodiments, the scheduler 300 is configured to identify the syscalls that are likely to tale a long time to execute, and preferentially execute those syscalls in multiple steps. However, there are syscalls where the execution time may vary depending the amount of data being carried. In some embodiments, the scheduler 300 dynamically monitors the execution of syscalls and then decides whether any of the submitted syscalls need to be executed in multiple steps.

In some embodiments, as noted above, a long-running syscall might require that the syscall be submitted using multiple SCSI commands on the array control device, for example to retrieve a significant amount of management data from the array. If a determination is made by the scheduler that execution of the syscall should be paused, the scheduler simply stops sending the syscall on the array control device when a response is received, saves the syscall state, and places the syscall in a queue for subsequent execution. Accordingly, the scheduler 300 does not need to notify the operating system that the syscall is being partitioned into multiple instances, but rather is able to manage partial execution of syscalls internally within the management daemon 220.

When a long running syscall is split into multiple steps to execute, the state of unfinished syscall needs to be saved in the syscall state data structure 305 until it is executed again. In some embodiments, hash tables are used to save the state of unfinished syscalls to ensure fast lookup and access to the saved state information. When an unfinished syscall is put back into a FIFO queue, the unfinished syscall has a pointer into the hash table where the state (the intermediate results, status, and statistics etc.) is saved. An entry in the hash table is created for any syscall that is not finished within the threshold time allotted. Each time the syscall is submitted for additional processing on an access control device, the entry is retrieved from the hash table and then updated if the syscall is once again stored for subsequent processing. The entry is therefore updated every time an unfinished syscall is put back into a queue. When the syscall is completed, with success or failure, the complete result of the syscall is returned to the caller, and the entry is removed from the hash table.

When a long running syscall is split into multiple parts to execute, each part may be executed on any available array control device. An array control device may fail in the middle of executing a syscall or part of a syscall, in either case the failure of the syscall is returned to the caller. If part of a syscall is stuck on an array control device and times out eventually, the syscall is timed out and the corresponding entry in the hash table is removed. If the management daemon 220 fails and restarts, all syscalls submitted to the management daemon 220 before the failure will time out.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

The invention claimed is:

1. A non-transitory tangible computer readable storage medium having stored thereon a computer program for optimizing system call (syscall) processing in a storage system, the computer program including a set of instructions which, when executed by a computer, cause the computer to perform a method comprising the steps of:
    receiving a set of system calls (syscalls);
    placing the set of syscalls into one or more sycall queues;
    selecting a syscall from a first of the syscall queues for submission to an available array control device;
    selecting an available array control device, and submitting the selected syscall on the selected array control device;
    receiving a corresponding syscall response on the selected array control device;

determining whether execution of the selected syscall is complete or whether execution of the selected syscall is only partially complete;

in response to determining that execution of the selected syscall is only partially complete, determining whether to continue execution of the selected syscall on the selected array control device or to pause execution of the selected syscall on the selected array control device;

in response to determining to pause execution of the selected syscall on the selected array control device:
saving state of the partially executed selected syscall;
placing the selected syscall into a selected one of the syscall queues; and
selecting another syscall for execution on the selected array control device;

wherein determining whether to continue execution of the selected syscall on the selected array control device comprises determining whether the syscall is within a threshold time limit away from an execution time limit for the selected syscall; and in response to determining that the selected syscall is not within a threshold time limit away from an execution time limit for the selected syscall, the step of placing the selected syscall into a selected one of the syscall queues comprises placing the selected syscall into the first of the syscall queues.

2. The non-transitory tangible computer readable storage medium of claim 1, further comprising, in response to determining to continue execution of the selected syscall on the selected array control device, submitting the selected syscall on the selected array control device.

3. The non-transitory tangible computer readable storage medium of claim 1, further comprising, in response to determining that execution of the syscall is complete, returning a result of the syscall.

4. The non-transitory tangible computer readable storage medium of claim 1, wherein determining whether to continue execution of the selected syscall on the selected array control device further comprises determining whether the selected syscall is a passive syscall type or an active syscall type.

5. The non-transitory tangible computer readable storage medium of claim 4, wherein the passive syscall type is configured to retrieve information from the storage system, and the active syscall type is configured to change operation of the storage system.

6. The non-transitory tangible computer readable storage medium of claim 5, in response to determining that the selected syscall is an active syscall type, determining to not pause execution of the selected syscall on the selected array control device.

7. The non-transitory tangible computer readable storage medium of claim 5, in response to determining that the syscall is a passive syscall type, determining to pause execution of the selected syscall on the selected array control device.

8. The non-transitory tangible computer readable storage medium of claim 1, wherein the one or more sycall queues comprises two or more syscall queues having different priorities; and
the method further comprising: in response to determining that the selected syscall is within a threshold time limit away from the an execution time limit for the selected syscall, the step of placing the selected syscall into a selected one of the syscall queues comprises placing the selected syscall into one of the syscall queues with a highest priority.

9. A method of optimizing system call (syscall) processing in a storage system, comprising:
receiving a set of system calls (syscalls);
placing the set of syscalls into one or more sycall queues;
selecting a syscall from a first of the syscall queues for submission to an available array control device;
selecting an available array control device, and submitting the selected syscall on the selected array control device;
receiving a corresponding syscall response on the selected array control device;
determining whether execution of the selected syscall is complete or whether execution of the selected syscall is only partially complete;
in response to determining that execution of the selected syscall is only partially complete, determining whether to continue execution of the selected syscall on the selected array control device or to pause execution of the selected syscall on the selected array control device;
in response to determining to pause execution of the selected syscall on the selected array control device:
saving state of the partially executed selected syscall;
placing the selected syscall into a selected one of the syscall queues; and
selecting another syscall for execution on the selected array control device;
wherein determining whether to continue execution of the selected syscall on the selected array control device comprises determining whether the syscall is within a threshold time limit away from an execution time limit for the selected syscall; and
in response to determining that the selected syscall is not within a threshold time limit away from an execution time limit for the selected syscall, the step of placing the selected syscall into a selected one of the syscall queues comprises placing the selected syscall into the first of the syscall queues.

10. The method of claim 9, further comprising, in response to determining to continue execution of the selected syscall on the selected array control device, submitting the selected syscall on the selected array control device.

11. The method of claim 9, further comprising, in response to determining that execution of the syscall is complete, returning a result of the syscall.

12. The method of claim 9, wherein determining whether to continue execution of the selected syscall on the selected array control device further comprises determining whether the selected syscall is a passive syscall type or an active syscall type.

13. The method of claim 12, wherein the passive syscall type is configured to retrieve information from the storage system, and the active syscall type is configured to change operation of the storage system.

14. The method of claim 13, in response to determining that the selected syscall is an active syscall type, determining to not pause execution of the selected syscall on the selected array control device.

15. The method of claim 13, in response to determining that the syscall is a passive syscall type, determining to pause execution of the selected syscall on the selected array control device.

16. A method of optimizing system call (syscall) processing in a storage system, comprising:
receiving a set of system calls (syscalls);
placing the set of syscalls into one or more sycall queues;
selecting a syscall from a first of the syscall queues for submission to an available array control device;

selecting an available array control device, and submitting the selected syscall on the selected array control device;

receiving a corresponding syscall response on the selected array control device;

determining whether execution of the selected syscall is complete or whether execution of the selected syscall is only partially complete;

in response to determining that execution of the selected syscall is only partially complete, determining whether to continue execution of the selected syscall on the selected array control device or to pause execution of the selected syscall on the selected array control device;

in response to determining to pause execution of the selected syscall on the selected array control device:
  saving state of the partially executed selected syscall;
  placing the selected syscall into a selected one of the syscall queues; and
  selecting another syscall for execution on the selected array control device;

wherein the one or more sycall queues comprises two or more syscall queues having different priorities; and the method further comprising: in response to determining that the selected syscall is within a threshold time limit away from an execution time limit for the selected syscall, the step of placing the selected syscall into a selected one of the syscall queues comprises placing the selected syscall into one of the syscall queues with a highest priority.

* * * * *